US010738369B2

(12) United States Patent
Um et al.

(10) Patent No.: US 10,738,369 B2
(45) Date of Patent: Aug. 11, 2020

(54) METHOD OF SEPARATING RARE EARTH ELEMENTS FROM RARE EARTH POLISHING POWDER WASTES

(71) Applicant: National Institute of Environmental Research, Incheon (KR)

(72) Inventors: Namil Um, Incheon (KR); Mi-Jeong Jeong, Incheon (KR); Young Yeul Kang, Incheon (KR); Ki-Heon Kim, Gyeonggi-do (KR); Cheol Woo Yoon, Incheon (KR); Yong Jun Kim, Incheon (KR); Yoon-A Cho, Incheon (KR); Byung-Seo Lim, Sejong-si (KR); Sun Kyoung Shin, Gyeonggi-do (KR); YoungKee Lee, Gyeonggi-do (KR)

(73) Assignee: NATIONAL INSTITUTE OF ENVIRONMENTAL RESEARCH, Incheon (KR)

( * ) Notice: Subject to any disclaimer, the term of this patent is extended or adjusted under 35 U.S.C. 154(b) by 333 days.

(21) Appl. No.: 15/826,253

(22) Filed: Nov. 29, 2017

(65) Prior Publication Data
US 2018/0195146 A1    Jul. 12, 2018

(30) Foreign Application Priority Data
Jan. 12, 2017    (KR) .................. 10-2017-0005130

(51) Int. Cl.
*C22B 3/00* (2006.01)
*C22B 3/08* (2006.01)
(Continued)

(52) U.S. Cl.
CPC ................. *C22B 3/08* (2013.01); *C22B 3/10* (2013.01); *C22B 3/44* (2013.01); *C22B 7/007* (2013.01); *C22B 59/00* (2013.01); *Y02P 10/234* (2015.11)

(58) Field of Classification Search
CPC .... C22B 3/08; C22B 3/10; C22B 3/44; C22B 7/007; C22B 59/00; Y02P 10/234
(Continued)

(56) References Cited

U.S. PATENT DOCUMENTS 5,362,459 A * 11/1994 Greenberg .......... C01F 17/0062
                                                          423/21.1
9,458,525 B2 * 10/2016 Yoon ..................... C22B 59/00

FOREIGN PATENT DOCUMENTS

| KR | 2004-0055219     | * | 6/2004  |
| KR | 100591383 B1     |   | 6/2006  |
| KR | 1020140142413 A  |   | 12/2014 |

OTHER PUBLICATIONS

Wubbeke et al, "Rare earth elements in China . . . " Resources Policy, Jul. 18, 2013, pp. 384-94, vol. 38. (Year: 2013).*
(Continued)

*Primary Examiner* — Steven J Bos
(74) *Attorney, Agent, or Firm* — Hultquist, PLLC; Steven J. Hultquist (57) ABSTRACT

The present invention relates to a method of separating rare earth elements from rare earth polishing powder waste by a hydrometallurgical process, the method comprising the steps of: synthesizing sodium rare-earth double sulfates by adding sulfuric acid and sodium hydroxide to the rare earth polishing powder waste; converting the sodium rare-earth double sulfates into rare earth hydroxides; and separating cerium (Ce), lanthanum (La), praseodymium (Pr), and neodymium (Nd) from the rare earth hydroxides by adding hydrochloric acid and sulfuric acid. The present invention makes it possible to recover 99% or more of rare earth elements, including cerium (Ce), lanthanum (La), praseodymium (Pr), and neodymium (Nd) from rare earth polishing powder waste, and enables the recovered rare earth elements to be
(Continued)

recycled, thereby achieving great industrial economic benefits.

4 Claims, 8 Drawing Sheets
(6 of 8 Drawing Sheet(s) Filed in Color)

(51) Int. Cl.
*C22B 3/10* (2006.01)
*C22B 7/00* (2006.01)
*C22B 3/44* (2006.01)
*C22B 59/00* (2006.01)

(58) Field of Classification Search
USPC .................................. 423/21.1, 263; 75/710
See application file for complete search history.

(56) References Cited

OTHER PUBLICATIONS

Beaudry, B.J., et al., "Chapter 2: Preparation and Basic Properties of the Rare Earth Metals", "Handbook on the Physics and Chemistry of Rare Earths", 1978, pp. 173-230, Publisher: North-Holland Publishing Company.

Baldi, L., et al., "Clean energy industries and rare earth materials: Economic and financial issues", "Energy Policy", 2014, pp. 53-61, vol. 66.

Chen, L., et al., "Effect of RE on molybdenum partitioning and resultant mechanical and microstructural behavior of a duplex stainless steel during hot working condition", "Journal of Rare Earths", Jan. 2015, pp. 107-112, vol. 33, No. 1.

Gupta, C. K., et al., "Extractive metallurgy of rare earths", "International Materials Reviews", 1992, pp. 197-248, vol. 37, No. 5.

Hoshino, T., et al., "Mechanism of polishing of SiO2 films by CeO2 particles", "Journal of Non-Crystalline Solids", 2001, pp. 129-136, vol. 283.

Kim, J.-Y., et al., "Recovery of cerium from glass polishing slurry", "Journal of Rare Earths", Nov. 2011, pp. 1075-1078, vol. 29, No. 11.

Ong, N. S., et al., "Semi-ductile grinding and polishing of Pyrex glass", "Journal of Materials Processing Technology", 1998, pp. 261-266, vol. 83.

Um, N., et al, "Conversion Kinetics of Cerium Oxide into Sodium Cerium Sulfate in Na2SO4—H2SO4—H2O Solutions", "Materials Transactions", Oct. 11, 2012, pp. 1992-1996, vol. 53, No. 11.

Um, N., et al, "Precipitation of Cerium Sulfate Converted from Cerium Oxide in Sulfuric Acid Solutions and the Conversion Kinetics", "Materials Transactions", Oct. 11, 2012, pp. 1986-1991, vol. 53, No. 11.

Um, N., et al, "Dissolution Behavior of La2O3, Pr2O3, Nd2O3, CaO and Al2O3 in Sulfuric Acid Solutions and Study of Cerium Recovery from Rare Earth Polishing Powder Waste via Two-Stage Sulfuric Acid Leaching", "Materials Transactions", Apr. 5, 2013, pp. 713-719, vol. 54, No. 5.

Um, N., et al, "A hydrometallurgical method of energy saving type for separation of rare earth elements from rare earth polishing powder wastes with middle fraction of ceria", "Journal of Rare Earths", May 2016, pp. 536-542, vol. 34, No. 5.

Wubbeke, J., "Rare earth elements in China: Policies and narratives of reinventing an industry", "Resources Policy", Jul. 18, 2013, pp. 384-394, vol. 38.

Xu, T., et al., "Formation cause, composition analysis and comprehensive utilization of rare earth solid wastes", "Journal of Rare Earths", Dec. 2009, pp. 1096-1102, vol. 27, No. 6.

Yu, Y., et al., "Recent advances in rare-earth elements modification of inorganic semiconductor-based photocatalysts for efficient solar energy conversion: A review", "Journal of Rare Earths", May 2015, pp. 453-462, vol. 33, No. 5.

\* cited by examiner

METHOD OF SEPARATING RARE EARTH ELEMENTS FROM RARE EARTH POLISHING POWDER WASTES

CROSS-REFERENCE TO RELATED APPLICATION

This application claims priority under 35 U.S.C. § 119 of Korean Patent Application No. 10-2017-0005130 filed January 12, 2017. The disclosure of such Korean priority patent application is hereby incorporated herein by reference in its entirety, for all purposes.

TECHNICAL FIELD

The present invention relates to a method of separating rare earth elements from rare earth polishing powder waste, and more particularly to a method of separating rare earth elements from rare earth polishing powder waste, the method comprising the steps of: adding sulfuric acid and sodium hydroxide to the rare earth polishing powder waste to synthesize sodium rare-earth double sulfates; converting the sodium rare-earth double sulfates into rare earth hydroxides; and separating cerium (Ce), lanthanum (La), praseodymium (Pr), and neodymium (Nd) from the rare earth hydroxides by addition of hydrochloric acid and sulfuric acid.

BACKGROUND ART

Many industries have become highly dependent on products that cannot be made without using rare earth metals (REEs) (Yu Y et al., A review. *J. Rare Earths*, 2015, 33: 453; Chen L et al., *J. Rare Earths*, 2015, 33: 107). Although the importance of REEs is increasing, the price of REEs is not stable due to a large change in supply (Baldi L. et al., *Energy Policy*, 2014, 66:53). For example, if China, which monopolizes the supply of rare earth metals, supplies a limited amount of rare earth metals, such supply cannot meet the demand of other countries (Wubbeke J. et al., *Res. Policy*, 2013, 38: 384). For this reason, many trading corporations and manufacturers in the world have recognized REEs as industrially and economically important resources, and thus have been planning their strategies to secure a stable supply.

As such, it is believed that waste containing REEs as part of ensuring a stable supply can play an important role in supplying resources, and many researchers have actively conducted studies on the recovery of REEs from various types of REEs-containing wastes. Indeed, a large amount of wastes containing REEs have been produced in various industry links, including rare metal radioactive residues, hydrometallurgy residues, polishing powders, rare metal catalysts, magnetic materials, disused hydrogen storage batteries, etc. (Tao X. et al., *J. Rare Earths*, 2009, 27: 1096).

In the polishing powder industry, REEs are regarded as ideal polishing material, and showed increased efficiency when actually used in industrial polishing processes (Beaudry B. J. et al., Handbook on the Physics and Chemistry of Rare Earths, 1978, 1: 173). For example, rare earth-based oxides have been widely used as polishing powder for glass, semiconductors and ceramics. This is because these oxides have crystalline structures with high polishing ability, mechanical strength and abrasion resistance. In particular, the fact that cerium oxide ($CeO_2$) is a representative rare earth-based oxide showing such characteristics has been proved by numerous studies (Ong N. S. et al., *Mater. Proc. Technol.*, 1998, 83: 261), and in recent years, the dependency of cerium oxide in rare earth-based oxides has started to increase. For this reason, rare earth polishing powder wastes (REPPWs) that currently occurs after polishing processes contain cerium oxide ($CeO_2$) as a main component and also contain small amounts of rare earth oxides such as $La_2O_3$, $Pr_2O_3$ and $Nd_2O_3$. However, polishing powder wastes contain not only rare earth oxides, but also polishing target residues consisting mostly of Al, Ca and Si components, which interfere with recycling of the polishing powder wastes. As mentioned above, research on the recovery of rare earths from rare earth polishing powder wastes (REPPWs), which are not easy to recycle, is urgently needed to ensure a smooth supply of REEs.

Among hydrometallurgical processes, an acid leaching process employing a sulfuric acid solution is the most general method that can recover REEs from REPPWs (Um N. et al., *Mater. Trans.*, 2013, 54: 713). However, the acid leaching process has some drawbacks in terms of separation and recovery. Because acid leaching can dissolve not only the materials to be recovered, but also other materials, another method is needed to separate these ions after acid leaching. Namely, if REEs are dissolved in an acid solution, it is inevitably difficult to purify these REEs from non-rare earth ions (Al, Ca, etc.). Since non-rare earth ions that are present together with rare earth oxides may have similar chemical and physical properties, it is considerably difficult to separate individual elements.

Accordingly, the present inventors have made extensive efforts to solve the above-described problems occurring in the prior art, and as a result, have found that rare earth elements contained in polishing powder waste can be separated from impurities such as aluminum, silicon, calcium, magnesium and the like by an effective wet process and thus recycled, thereby completing the present invention.

SUMMARY OF INVENTION

It is an object of the present invention to provide a method for efficiently treating rare earth polishing powder wastes (REPPWs) by recovering and recycling the rare earth polishing powder wastes (REPPWs) to secure resources of wastes.

To achieve the above object, the present invention provides a method of separating rare earth elements from rare earth polishing powder waste, the method comprising the steps of:

(a) synthesizing a solution of sodium rare earth double sulfates ($NaRe(SO_4)_2 \cdot xH_2O$, wherein Re represents rare earth elements, and x is a rational number of 0 to 2) by adding the polishing powder waste to an aqueous solution of $Na_2SO_4$ and $H_2SO_4$;

(b) removing an leachate from a synthesized solution of step (a) by solid-liquid separation, and then converting the sodium rare earth double sulfates ($NaRe(SO_4)_2 \cdot xH_2O$) into trivalent rare earth hydroxides ($Re(OH)_3$) by adding a remaining solid material to an aqueous solution of NaOH;

(c) converting trivalent cerium hydroxide ($Ce(OH)_3$) into tetravalent cerium hydroxide ($Ce(OH)_4$) by injecting air into a solution containing the trivalent rare earth hydroxides ($Re(OH)_3$) of step (b);

(d) dissolving trivalent lanthanum hydroxide ($La(OH)_3$), praseodymium hydroxide ($Pr(OH)_3$), and neodymium hydroxide ($Nd(OH)_3$) by adding HCl to a solution resulting from step (c) and then separating lanthanum (La), praseodymium (Pr) and neodymium (Nd) by solid-liquid separation; and (e) obtaining a leachate containing cerium dissolved therein by adding $H_2SO_4$ to a solid material remaining after the separating in step (d) to dissolve the tetravalent cerium hydroxide ($Ce(OH)_4$)), and then separating cerium (Ce) from the leachate by solid-liquid separation.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

BEST MODE FOR CARRYING OUT THE INVENTION

Unless defined otherwise, all the technical and scientific terms used herein have the same meaning as those generally understood by one of ordinary skill in the art to which the invention pertains. Generally, the nomenclature used herein and the experiment methods, which will be described below, are those well-known and commonly employed in the art. Description of the same elements that not important will be omitted to avoid redundancy.

In the present invention, it was found that rare earth elements can be effectively separated from rare earth polishing powder waste by adding sulfuric acid and sodium hydroxide to the rare earth polishing powder waste to synthesize sodium rare-earth double sulfates, converting the sodium rare-earth double sulfates into rare earth hydroxides, and separating cerium (Ce), lanthanum (La), praseodymium (Pr), and neodymium (Nd) from the rare earth hydroxides by addition of hydrochloric acid and sulfuric acid.

Therefore, in one aspect, the present invention is directed to a method of separating rare earth elements from rare earth polishing powder waste, the method comprising the steps of:

(a) synthesizing a solution of sodium rare earth double sulfates ($NaRe(SO_4)_2 \cdot xH_2O$, wherein Re represents rare earth elements, and x is a rational number of 0 to 2) by adding the polishing powder waste to an aqueous solution of $Na_2SO_4$ and $H_2SO_4$;

(b) removing an leachate from a synthesized solution of step (a) by solid-liquid separation, and then converting the sodium rare earth double sulfates ($NaRe(SO_4)_2 \cdot xH_2O$) into trivalent rare earth hydroxides ($Re(OH)_3$) by adding a remaining solid material to an aqueous solution of NaOH;

(c) converting trivalent cerium hydroxide ($Ce(OH)_3$) into tetravalent cerium hydroxide ($Ce(OH)_4$) by injecting air into a solution containing the trivalent rare earth hydroxides ($Re(OH)_3$) of step (b);

(d) dissolving trivalent lanthanum hydroxide ($La(OH)_3$), praseodymium hydroxide ($Pr(OH)_3$), and neodymium hydroxide ($Nd(OH)_3$) by adding HCl to a solution resulting from step (c) and then separating lanthanum (La), praseodymium (Pr) and neodymium (Nd) by solid-liquid separation; and (e) obtaining a leachate containing cerium dissolved therein by adding $H_2SO_4$ to a solid material remaining after the separating in step (d) to dissolve the tetravalent cerium hydroxide ($Ce(OH)_4$), and then separating cerium (Ce) from the leachate by solid-liquid separation.

The present invention can provide an effective wet process for separating rare earth elements from polishing powder waste containing rare earth oxides such as cerium oxide ($CeO_2$), lanthanum oxide ($La_2O_3$), praseodymium oxide ($Pr_2O_3$), and neodymium oxide ($Nd_2O_3$). The wet process consists of five steps, and each step will now be described in detail.

(a) Step of Synthesizing Sodium Rare-Earth Double Sulfates

Rare earth polishing powder waste (REPPW) contains $CeO_2$, $La_2O_3$, $Pr_2O_3$, $Nd_2O_3$, CaO, $Al_2O_3$, $SiO_2$, MgO and other impurities, which generally have a particle size of less than 0.5 μm.

In the first step of the method of separating rare earth elements from rare earth polishing powder waste according to the present invention, the polishing powder waste is added to an aqueous solution of $Na_2SO_4$ and $H_2SO_4$ to synthesize rare earths contained in the polishing powder waste into sodium rare-earth double sulfates ($NaRe(SO_4)_2 \cdot xH_2O$, wherein Re represents rare earth elements, and x is a rational number of 0 to 2).

Step (a) may be performed at a temperature of at least 95° C., preferably 95° C. to 200° C., more preferably 95° C. to 125° C.

In the above temperature range, the dissolution rate of $CeO_2$ and the synthesis rate of $NaCe(SO_4)_2 \cdot H_2O$ increase, and thus the yield of $NaCe(SO_4)_2 \cdot xH_2O$ increases as the reaction temperature increases.

The concentrations of $Na_2SO_4$ and $H_2SO_4$ in step (a) are 0.4 to 2.5 mol/dm$^3$ and 6 to 14 mol/dm$^3$, respectively, at which the synthesis smoothly occurs. Preferably, the concentrations of $Na_2SO_4$ and $H_2SO_4$ are 0.4 mol/dm$^3$ and 8 mol/dm$^3$, respectively, which show the highest synthesis efficiency. If the concentration of $Na_2SO_4$ is higher than 2.5 mol/dm$^3$, the concentration of $H^+$ decreases and the dissolution rate of $CeO_2$ decreases, and thus the yield decreases. If the concentration of $H_2SO_4$ is lower than 6 mol/dm$^3$, the dissolution rate of $CeO_2$ decreases rapidly, and if the concentration of $H_2SO_4$ is higher than 14 mol/dm³, the precipitation of $Ce(SO_4)_2$ increases rapidly, thus reducing the yield.

(b) Step of Synthesizing Rare Earth Hydroxides $(Re(OH)_3$

In the second step of the method of separating rare earth elements from rare earth polishing powder waste according to the present invention, the leachate of step (a), which contains primary impurities dissolved therein, is subjected to solid-liquid separation to remove the liquid, and then the remaining solid material is added to an aqueous solution of NaOH to convert the sodium rare-earth double sulfates $(NaRe(SO_4)_2 \cdot xH_2O)$ contained in the solid material into trivalent rare earth hydroxides $(Re(OH)_3)$.

(c) Step of Synthesizing Tetravalent Cerium Hydroxide $(Ce(OH)_4)$

In third step of the method of separating rare earth elements from rare earth polishing powder waste according to the present invention, $O_2$-containing air is injected into the solid/liquid material resulting from step (b) to convert the trivalent cerium hydroxide $(Ce(OH)_3)$ into tetravalent cerium hydroxide $(Ce(OH)_4)$.

(d) Step of Separating of Lanthanum (La), Praseodymium (Pr) and Neodymium (Nd)

In fourth step of the method of separating rare earth elements from rare earth polishing powder waste according to the present invention, HCl is added to the solid/liquid material resulting from step (c) to dissolve trivalent lanthanum hydroxide $(La(OH)_3)$, praseodymium hydroxide $(Pr(OH)_3)$, and neodymium hydroxide $(Nd(OH)_3)$, and the leachate containing lanthanum (La), praseodymium (Pr) and neodymium (Nd) dissolved therein is subjected to solid-liquid separation to separate lanthanum (La), praseodymium (Pr) and neodymium (Nd).

Step (d) may be performed at a pH of 1.5 to 5.5. Preferably, step (d) is performed at a pH of 2.5 to 3.5, which shows high separation efficiency. Particularly, step (d) is performed at a pH of 2.83, which shows the highest separation efficiency. At a pH lower than 1.5, the percent purity of the remaining $Ce(OH)_4$ exceeds 99% as pH lowers, whereas the yield decreases rapidly. At a pH higher than 5.5, there is a problem in that $La(OH)_3$, $Pr(OH)_3$, and $Nd(OH)_3$, which are undesirable by-products, interfere with obtaining high-purity $Ce(OH)_4$.

(e) Step of Separating Cerium (Ce)

In the last step of the method of separating rare earth elements from rare earth polishing powder waste according to the present invention, the solid material obtained by solid-liquid separation in step (d) is added to an aqueous solution of $H_2SO_4$ to dissolve the tetravalent cerium hydroxide $(Ce(OH)_4)$, and the leachate containing cerium dissolved therein is subjected to solid-liquid separation to separate cerium from solid secondary impurities.

EXAMPLES

Hereinafter, the present invention will be described in further detail with reference to examples. It will be obvious to a person having ordinary skill in the art that these examples are for illustrative purposes only and are not to be construed to limit the scope of the present invention.

$CeO_2$, $Ce(OH)_4$, $La_2O_3$, $La(OH)_3$, $Pr_2O_3$, $Pr(OH)_3$, $Nd_2O_3$, $Nd(OH)_3$, CaO, $Al_2O_3$, $SiO_2$, and MgO that were used in Examples had a metal purity of >99.9% and a particle size of <5 μm. HCl, $Na_2SO_4$, NaOH, and $H_2SO_4$ that were used in the present invention were products (purity: 99.0%) manufactured by Wako Pure Chemical Industries, Ltd.

Example 1: Synthesis of $NaCe(SO_4)_2 \cdot xH_2O$ from $CeO_2$

All synthetic experiments were performed in a batch-type glass reactor at atmospheric pressure. 20 mmol of $CeO_2$ powder was added to 100 mL of a sulfuric acid solution (concentration: 6-14 mol/dm³) containing 0.4-2.5 mol/dm³ of $Na_2SO_4$. The solution was heated, allowed to stand at temperatures of 95° C., 105° C., 115° C. and 125° C., and stirred at 650 rpm by use of a magnet stirrer. The experiment was repeated 5 times to obtain each data, and the error range with respect to the standard deviation of the data was measured.

In order to measure the weights of $CeO_2$ residue and synthesized $NaCe(SO_4)_2 \cdot xH_2O$, a solution sampled at a suitable time point of reaction was filtered using a pressure filtration unit on a membrane having a pore size of 0.5 μm, and then washed three times with ethanol to remove sulfuric acid. Then, the sample was dried at a temperature of 100° C. for 24 hours, and then the sample weight (a) was measured using a balance. Thereafter, the sample was added to a sulfuric acid solution (3-4 mol/dm³) at 90° C. to dissolve a cerium (IV) sulfate $(Ce(SO_4)_2)$ precipitate. $CeO_2$-containing residue and synthesized $NaCe(SO_4)_2 \cdot xH_2O$ were filtered from the solution and washed with ethanol. After drying at a temperature of 100° C. for 24 hours, the weight (b) of the precipitate composed of $CeO_2$ residue and synthesized $NaCe(SO_4)_2 \cdot xH_2O$ was measured using a balance.

The precipitate was added to 1000 mL of an alkaline solution containing 0.7 mol NaOH to concert $NaCe(SO_4)_2 \cdot xH_2O$ into $Ce(OH)_3$. Then, the solution was continuously added to 1000 mL of an acid solution containing 1 mol HCl to dissolve $Ce(OH)_3$ and was filtered and dried at a temperature of 100° C. for 24 hours, and then the weight (c) of $CeO_2$ residue was measured using a balance. The weight difference between (a) and (b) and the weight difference between (b) and (c) indicate the weight of precipitated $Ce(SO_4)_2$ and the weight of synthesized $NaCe(SO_4)_2 \cdot xH_2O$, respectively: The weight of $Ce(SO_4)_2$ was used to describe the effect of $H_2SO_4$ concentration on the synthesis of $NaCe(SO_4)_2 \cdot xH_2O$.

Example 2: Purification of $Ce(OH)_4$

The initial concentration of each of $Ce(OH)_4$, $La(OH)_3$, $Pr(OH)_3$, and $Nd(OH)_3$ was set at a constant level of 0.1 mol/dm³, and 100 mL of an aqueous solution having such initial concentrations was prepared. At room temperature (25° C.), the aqueous solution was adjusted to a pH of 1.5-5.5 by addition of a dilute HCl solution, and stirred with a magnet stirrer at 650 rpm. After stirring, the residue was separated using filter paper. After filtration, the filtrate was analyzed by inductively coupled plasma atomic emission spectrometry (OPTIMA 5300DV, Perkin Elmer) to measure the concentrations of Ce, La, Pr and Nd. In addition, the residue was dissolved in an acid solution of HCl, and then analyzed by inductively coupled plasma atomic emission spectrometry to determine the chemical composition of the residue.

Example 3: Five-Step Process for Separating Rare Earth Elements from Rare Earth Polishing Powder Wastes (REPPWs)

The chemical compositions of various kinds of polishing powder wastes are as shown in Table 1 below.

TABLE 1

| Elements | | | | | | | | |
|---|---|---|---|---|---|---|---|---|
| Ce | La | Pr | Nd | Ca | Al | Si | Mg | |
| 33-94 | 0-33 | 0-5 | 0-14 | 5 | 1.5 | 1.5 | — | Tao X et al., J. Rare Earths, 2009, 27: 1096 |
| 8.34 | — | — | — | — | — | 24.02 | — | Yoon et al., J. Kor. Inst. Res. Rec. 2005, 14: 3 |
| 22.1 | 17.8 | 2.3 | 5.1 | — | — | 24.8 | — | Kato et al., Ind. Eng. Res., 2000, 39: 943 |
| 51 | 32 | 2 | — | 5.3 | 5.3 | 1.5 | — | Chong et al., VATTEN, 2009, 65: 193 |
| 39.40 | 20.00 | — | — | 0.22 | 0.22 | 4.30 | 0.11 | Kim et al., J. Rare Earths, 2011, 29: 1075 |
| 22.49 | 17.72 | 1.41 | 0.21 | 9.27 | 9.27 | 11.53 | 3.65 | Wang et al., J. Ther. Anal. Calorim., 2011, DOI 10.1007/s10973-011-1500-2 |

Since REPPWs contain not only rare earth oxides ($CeO_2$, La—, Pr—, and $Nd_2O_3$), but also impurities such as non-rare earth elements (Ca, Al, Si, and Mg), a process of efficiently separating rare earths from REPPWs is needed. Thus, based on the result data shown in FIGS. 2, 3, 5, 6, and 7, an effective process was designed which is a five-step process including: synthesis of $NaRe(SO_4)_2 \cdot xH_2O$ from rare earth oxides in a $Na_2SO_4 \cdot H_2SO_4 \cdot H_2O$ solution (step 1); conversion into $Re(OH)_3$ (step 2); and separation of REEs by oxidation and acid leaching (steps 3, 4, and 5).

Figure 1:
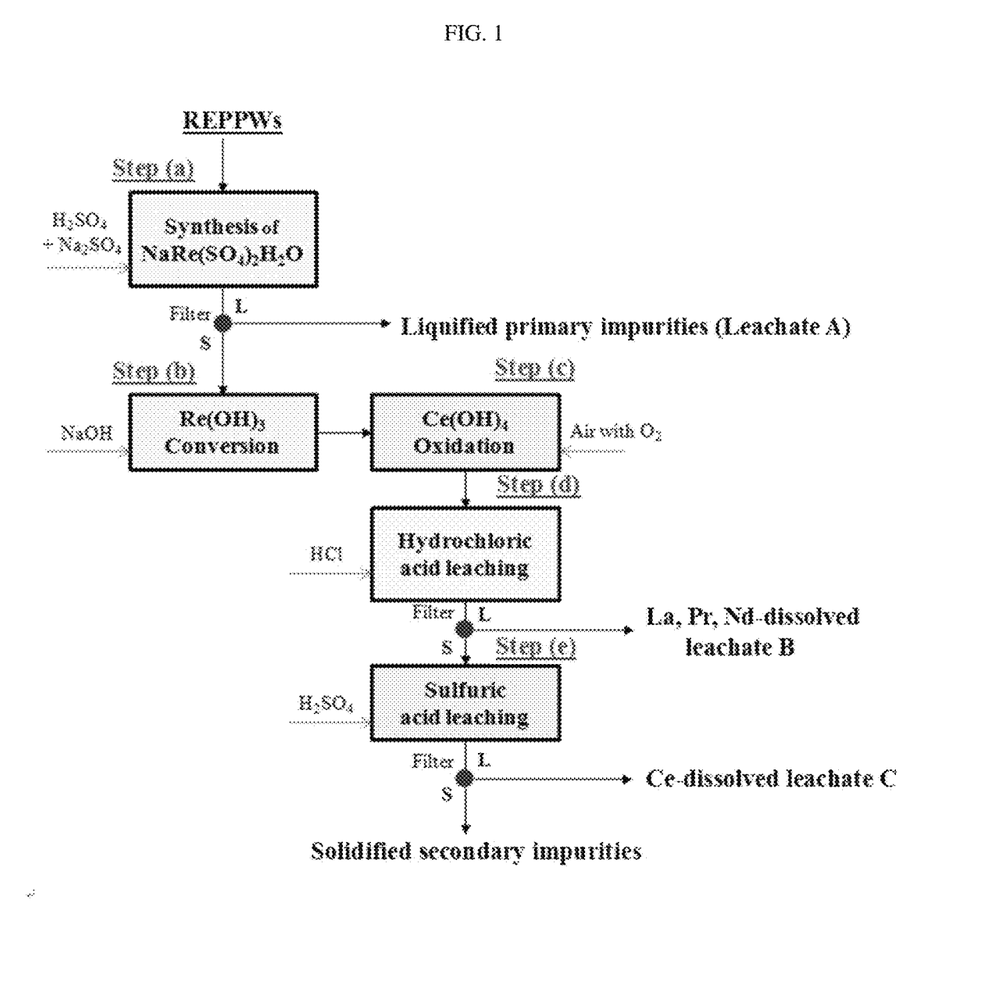
FIG. 1 is a schematic diagram showing a method of separating rare earth elements from rare earth polishing powder waste according to the present invention.

FIG. 1 schematically shows the five-step process, and each step of the process will not be described in detail.

Step 1: Synthesis of $NaRe(SO_4)_2 \cdot xH_2O$ from Rare Earth Oxides

In the case of $CeO_2$, the reaction rate of reaction (1) is very slow, and thus significantly affects the synthesis rate of $NaRe(SO_4)_2 \cdot xH_2O$. Such results are as reported by Um and Hirato (Um N et al., *Mater Trans.*, 2012b, 53: 1986), and indicate that a period of time of 48 hours or more was taken to completely dissolve 0.02 mol of $CeO_2$ powder having an average particle size of 2.5 μm in 100 ml of sulfuric acid (8 mol/dm³) at 25° C. In addition, unlike other REEs present in a trivalent state, cerium is present in a tetravalent state and changes into a trivalent state during dissolution in acid, and thus undergoes a complex process during synthesis. According to Um and Hirato (Um N et al., *Mater. Trans.*, 2012a, 53: 1992), a process of synthesizing $NaRe(SO_4)_2 \cdot xH_2O$ from $CeO_2$ in a $Na_2SO_3 \cdot H_2SO_4 \cdot H_2O$ solution is expected to include the following chemical reactions (1), (2) and (3). Dissolving $CeO_2$ in a sulfuric acid solution can be represented by the following reaction equation:

$$CeO_2 + 4H^+ \rightarrow Ce^{4+} + 2H_2O \quad (1).$$

Thereafter, cerium (IV) cation is reduced into cerium (III) cation:

$$Ce^{4+} + \tfrac{1}{2}H_2O \rightarrow Ce^{3+} + H^+ + \tfrac{1}{4}O_2 \quad (2).$$

A cerium precipitate as $NaRe(SO_4)_2 \cdot xH_2O$ in the $Na_2SO_4 \cdot H_2SO_4 \cdot H_2O$ solution undergoes the following reaction:

$$Ce^{3+} + 2Na_2SO_4 + xH_2O \rightarrow NaCeSO_4)_2 \cdot xH_2O + 3Na^+ \quad (3).$$

However, since $Ce^{4+}$ dissolved in high-concentration sulfuric acid is easily oversaturated, does not undergo reaction (2), and is formed directly into cerium (IV) sulfate ($Ce(SO_4)_2$) as shown in the following reaction (4), it does not change into $Ce^{3+}$, and thus interferes with the synthesis of $NaCe(SO_4)_2 \cdot xH_2O$ (Um N et al., *Mater Trans.*, 2012b, 53: 1986):

$$Ce^{4+} + 2SO_4^{2-} \rightarrow Ce(SO_4)_2 \quad (4).$$

Figure 3:
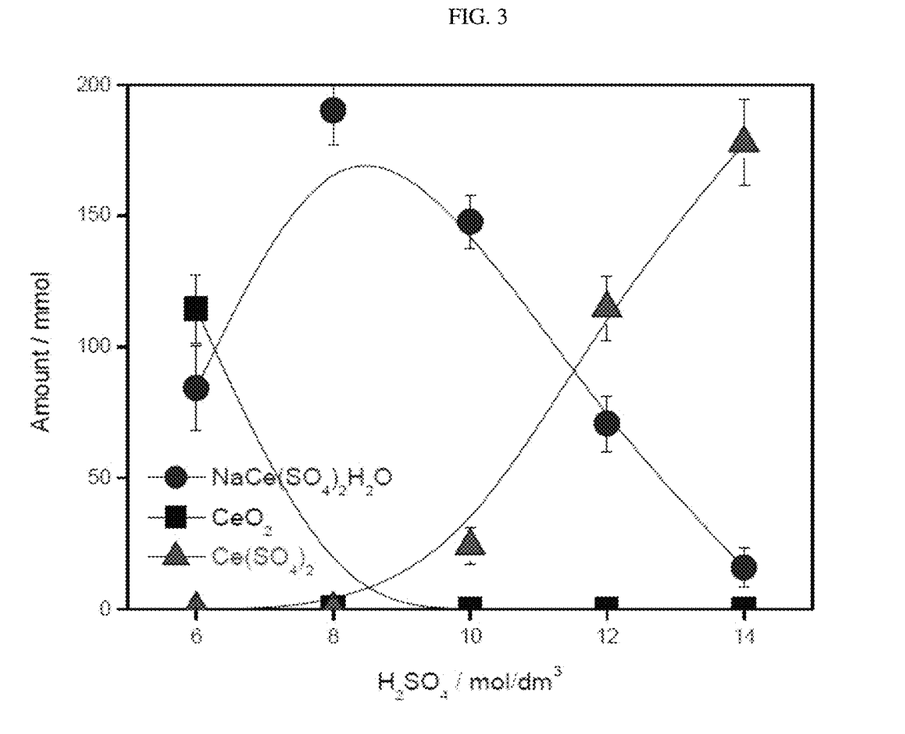
FIG. 3 is a graph showing the effect of sulfuric acid concentration on the synthesis of $NaCe(SO_4)_2 \cdot H_2O$ from $CeO_2$ in in a $Na_2SO_4$—$H_2SO_4$—$H_2O$ solution in the separation method of the present invention.

This fact is shown in FIG. 3.

Figure 2:
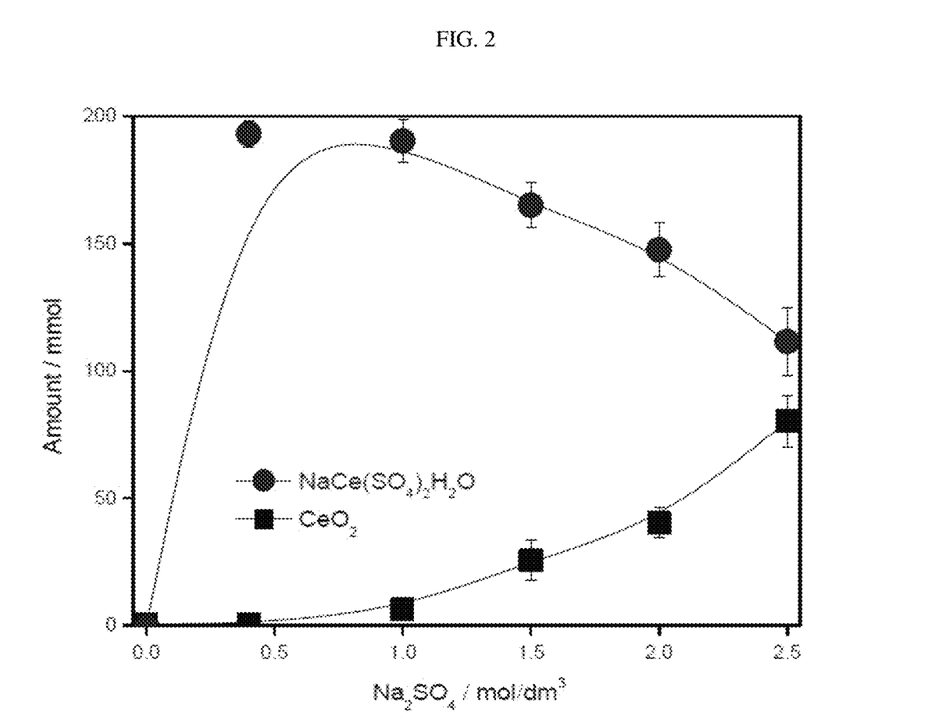
FIG. 2 is a graph showing the effect of $Na_2SO_4$ concentration on the synthesis of $NaCe(SO_4)_2 \cdot H_2O$ from $CeO_2$ in a $Na_2SO_4$—$H_2SO_4$—$H_2O$ solution in the separation method of the present invention.
Figure 4:
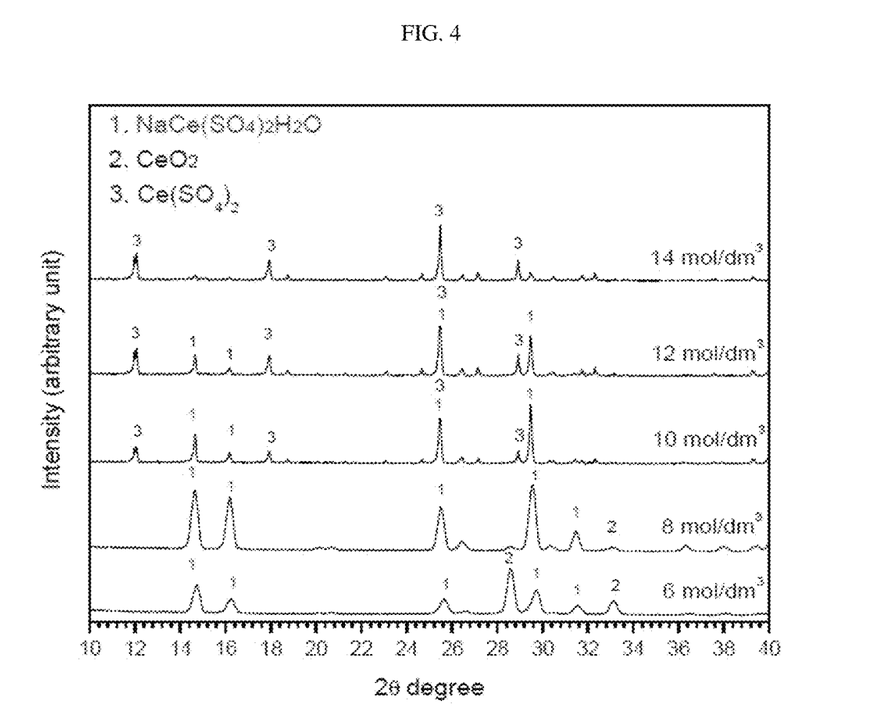
FIG. 4 is a graph showing the results of XRD analysis of precipitates, performed to examine the effect of sulfuric acid concentration on the synthesis of $NaCe(SO_4)_2 \cdot H_2O$ from $CeO_2$ in in a $Na_2SO_4$—$H_2SO_4$—$H_2O$ solution in the separation method of the present invention.
Figure 5:
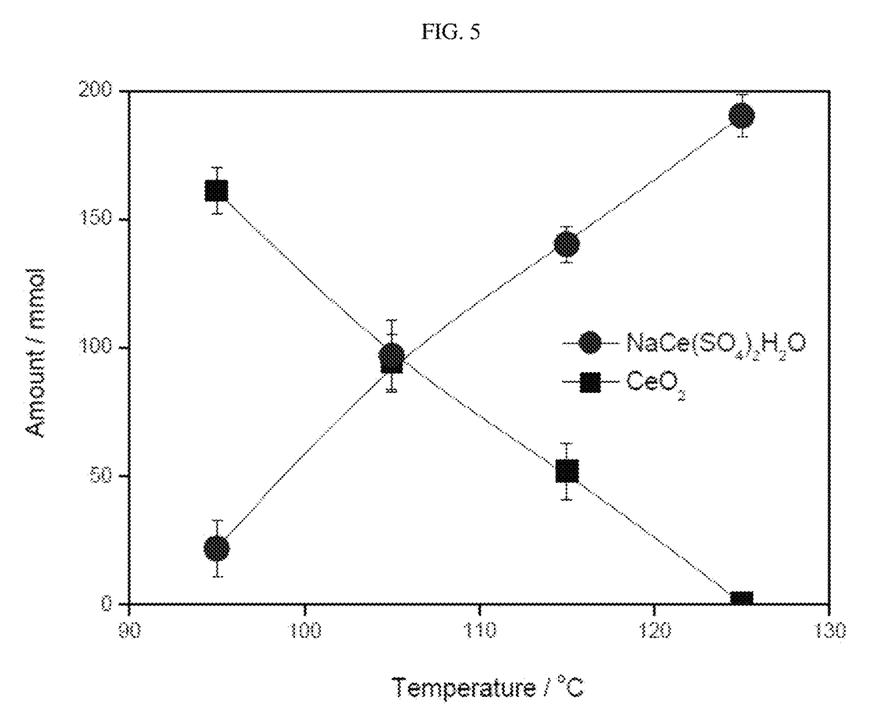
FIG. 5 is a graph showing the effect of reaction temperature on the synthesis of $NaCe(SO_4)_2 \cdot H_2O$ from $CeO_2$ in a $Na_2SO_4$—$H_2SO_4$—$H_2O$ solution in the separation method of the present invention.

The yield of $NaCe(SO_4)_2 \cdot xH_2O$ synthesized from $CeO_2$ in a $Na_2SO_4 \cdot H_2SO_4 \cdot H_2O$ solution was evaluated as a function of $Na_2SO_4$ concentration, sulfuric acid concentration and reaction temperature, and the results are shown in FIGS. 2, 3 and 5, respectively. First, the effect of $Na_2SO_4$ concentration was tested by changing the concentration of $Na_2SO_4$ in the range from 0.4 mol/dm³ to 2.5 mol/dm³. In these tests, initial $CeO_2$ concentration, reaction temperature and initial sulfuric acid concentration were set at 0.2 mol/dm³, 125° C. and 8 mol/dm³, respectively, and a reaction was performed for 36 hours. As shown in FIG. 2, the dissolution rate of $CeO_2$ and the yield of $NaCe(SO_4)_2 \cdot xH_2O$ decreased as the concentration of $Na_2SO_4$ increased. The change in the $Na_2SO_4$ concentration affected the synthesis of $NaCe(SO_4)_2 \cdot xH_2O$. According to reaction equation (3), an initial $Na_2SO_4$ concentration of 2 mol was required per mol of cerium, and thus a $Na_2SO_4$ concentration of only 0.4 mol/dm³ was sufficient for an initial $CeO_2$ concentration of 0.2 mol/dm³. However, an excessive amount of $Na_2SO_4$ interferes with the dissolution of $CeO_2$. For example, as the concentration of $Na_2SO_4$ increases, the frequency of the reaction $Na_2SO_4 \rightarrow 2Na^+ + SO_4^{2-}$ increases to increase the concentration of $SO_4^{2-}$, and the $H^+$ ion and $SO_4^{2-}$ ion required for the dissolution of $CeO_2$ cause the reaction $H^+ + SO_4^{2-} \rightarrow HSO_4^-$ to reduce $H^+$. For this reason, the dissolution rate of $CeO_2$ decreases, and thus the yield of $NaRe(SO_4)_2 \cdot xH_2O$ synthesized decreases (Um N et al., *Mater. Trans.*, 2012a, 53: 1992). Meanwhile, the effect of sulfuric acid concentration is shown in FIG. 3. The effect of sulfuric acid concentration was tested by changing the concentration of sulfuric acid in the range from 6 mol/dm³ to 14 mol/dm³. In these tests, initial $CeO_2$ concentration, reaction temperature and initial $Na_2SO_4$ concentration were set at 0.2 mol/dm³, 125° C. and 0.4 mol/dm³, respectively, and a reaction was performed for 36 hours. As shown in FIG. 3, the dissolution rate of $CeO_2$ increased as the concentration of sulfuric acid increased, but the yield curve of $NaCe(SO_4)_2 \cdot xH_2O$ showed a ∩-shape at a sulfuric acid concentration of 6 to 14 mol/dm³. The increase in the yield of $NaCe(SO_4)_2 \cdot xH_2O$ with the increase in the sulfuric acid concentration can be explained by the well-known common ion effect. As mentioned above, the increase in the sulfuric acid concentration with the increase in the $SO_4^{2-}$ ion concentration induces an increase in a precipitate of cerium (IV) phosphate $(Ce(SO_4)_2)$ as shown in reaction equation (4), and thus reduces $Ce^{4+}$ into $Ce^{3+}$ (trivalent) which interferes with the synthesis of $NaCe(SO_4)_2 \cdot xH_2O$. At a sulfuric acid concentration of 8 mol/dm³, $NaCe(SO_4)_2 \cdot xH_2O$ is obtained in a high yield of 190 mmol or more, but at a sulfuric acid concentration of 14 mol/dm³, the yield of $NaCe(SO_4)_2 \cdot xH_2O$ decreases rapidly to 20 mmol at the same reaction time. Furthermore, at a sulfuric acid concentration lower than 8 mol/dm³, the dissolution rate of $CeO_2$ decreases, resulting in a decrease in the yield of $NaCe(SO_4)_2 \cdot xH_2O$. FIG. 4 shows XRD patterns the yield of $Na_2SO_4$—$H_2SO_4$—$H_2O$, precipitated $Ce(SO_4)_2$, and $CeO_2$ residue remaining after the reaction, at varying sulfuric acid concentrations. The results in FIG. 4 support the results shown in FIG. 3. Next, in order to examine the effect of reaction temperature, tests were performed by changing the reaction temperature in the range from 95° C. to 125° C. In these tests, initial $CeO_2$ concentration, initial $Na_2SO_4$ concentration and sulfuric acid concentration were set at 0.2 mol/dm³, 0.4 mol/dm³ and 8 mol/dm³, respectively, and a reaction was performed for 36 hours. As shown in FIG. 5, the dissolution rate of $CeO_2$ and the synthesis rate of $NaCe(SO_4)_2 \cdot H_2O$ all increased as the reaction temperature increased.

Figure 6:
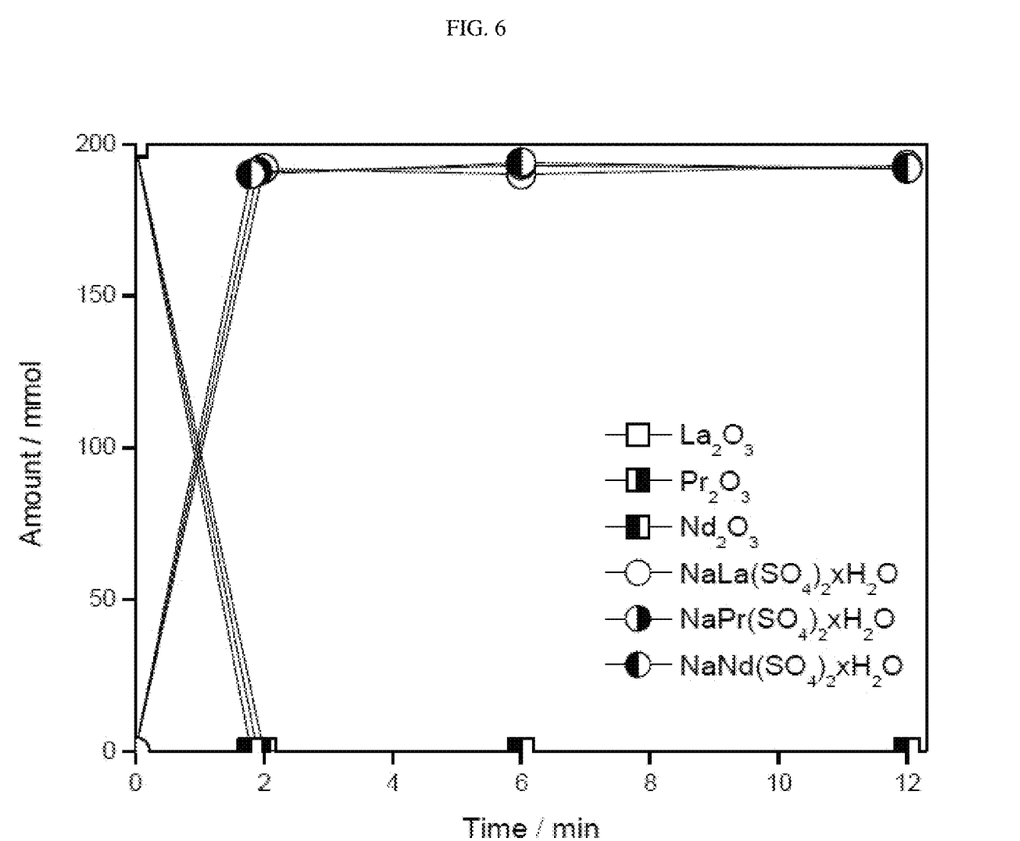
FIG. 6 is a graph showing the synthetic behavior of $NaCe(SO_4)_2 \cdot H_2O$ from $La_2O_3$, $Pr_2O_3$ and $Nd_2O_3$ in a $Na_2SO_4$—$H_2SO_4$—$H_2O$ solution at varying reaction times in the separation method of the present invention.

$La_2O_3$, $Pr_2O_3$, and $Nd_2O_3$ show very high dissolution rates in an acid solution, and thus are easily converted into $NaRe(SO_4)_2 \cdot xH_2O$. In order to confirm this fact, examination was performed of the rates at which $La_2O_3$, $Pr_2O_3$, and $Nd_2O_3$, each having a particle size of <5 μm, was converted into $NaRe(SO_4)_2 \cdot xH_2O$ in a $Na_2SO_4$—$H_2SO_4$—$H_2O$ solution. Initial sulfuric acid concentration, $Na_2SO_4$ concentration and reaction temperature were set at 8 mol/dm³, 0.4 mol/dm³ and 125° C., respectively (see FIGS. 2, 3, and 5). In addition, the initial concentrations of $La_2O_3$, $Pr_2O_3$, and $Nd_2O_3$ were 0.2 mol/dm³. The results are shown in FIG. 6. As a result, it was shown that La, Pr, and Nd oxides were dissolved rapidly, and the dissolved La, Pr or Nd ion was synthesized into $NaLa(SO_4)_2 \cdot xH_2O$ within about 2 minutes. The following reaction equations (5) to (10) are reaction equations for describing a process of converting La, Pr, and Nd oxides into $NaRe(SO_4)_2 \cdot xH_2O$:

$$La_2O_3 + 6H^+ \rightarrow La^{3+} + 3H_2O \quad (5)$$

$$Nd_2O_3 + 6H^+ \rightarrow Nd^{3+} + 3H_2O \quad (6)$$

$$Pr_2O_3 + 6H^+ \rightarrow Pr^{3+} + 3H_2O \quad (7)$$

$$La^{3+} + 2Na_2SO_4 + xH_2O \rightarrow NaLa(SO_4)_2 \cdot xH_2O + 3Na^+ \quad (8)$$

$$Nd^{3+} + 2Na_2SO_4 + xH_2O \rightarrow NaNd(SO_4)_2 \cdot xH_2O + 3Na^+ \quad (9)$$

$$Pr^{3+} + 2Na_2SO_4 + xH_2O \rightarrow NaPr(SO_4)_2 \cdot xH_2O + 3Na^+ \quad (10)$$

Steps 2, 3, 4, and 5: $Re(OH)_2$ Conversion, Oxidation and Acid Leaching

In order to effectively separate and recover cerium (Ce), which is present as a main phase and the highest content component in REPPWs, and other rare earth elements (lanthanum (La), praseodymium (Pr) and neodymium (Nd)), from REPPWs, it is highly effective to apply the following four steps, including $Re(OH)_2$ conversion, oxidation and acid leaching, after the step of synthesizing $NaRe(SO_4)_2 \cdot xH_2O$:

Conversion of $NaRe(SO_4)_2 \cdot xH_2O$ into $Re(OH)_3$ by use of NaOH (step 2);

Oxidation of $Ce(OH)_3$ into $Ce(OH)_4$ by injection of $O_2$-containing air (step 3);

Acid leaching with HCl and sulfuric acid (steps 4 and 5).

The following reaction equations 11 and 12 are related to steps 2 and 3:

$$NaRe(SO_4)_2 \cdot xH_2O + 3NaOH \rightarrow Re(OH)_3 \downarrow + 2Na_2SO_4 + xH_2O \quad (11)$$

(Re=Ce, La, Pr and Nd)

$$2Ce(OH)_3 + \tfrac{1}{2}O_2 + H_2O \rightarrow 2Ce(OH)_4 \quad (12).$$

Figure 7:
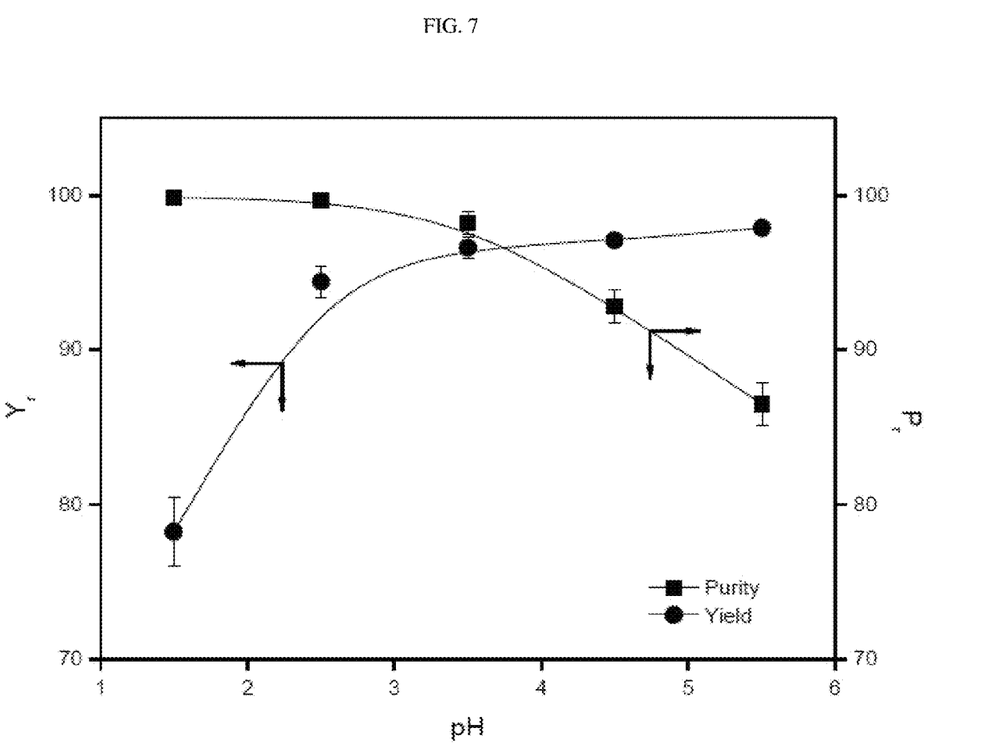
FIG. 7 is a graph showing the yield ($Y_c$) and purity ($P_c$) of $Ce(OH)_4$ in $HCl$—$H_2O$ solutions containing $Ce(OH)_4$, $La(OH)_3$, $Pr(OH)_3$ and $Nd(OH)_3$ at varying pHs in the separation method of the present invention.

In step 3, injection of $O_2$-containing air into a mixture of Ce—, La—, Pr—, and $Nd(OH)_3$ makes it possible to recover high-purity Ce from La, Pr and Nd. This is because $Ce(OH)_4$ which is converted from $Ce(OH)_3$ is less soluble than La—, Pr—, and $Nd(OH)_3$ in a dilute acid solution. In order to evaluate the effect of pH on the separation of $Ce(OH)_4$ from Ce—, La—, Pr—, and $Nd(OH)_3$ in a dilute acid solution in step 4 (acid leaching with HCl) after the oxidation reactions in steps 2 and 3, the yield and percent yield of residual $Ce(OH)_4$ in a HCl—$H_2O$ solution containing $Ce(OH)_4$, La—, Pr—, and $Nd(OH)_3$ at varying pHs were examined, and the results are shown in FIG. 7. The yield and percent purity (Pc) of residual $Ce(OH)_4$ were calculated using the following equations:

$$Y_c = (Y_t/Y_0) \times 100 \quad (13)$$

$$P_c = (Y_t/P_t) \times 100 \quad (14)$$

wherein $Y_0$ represents the initial concentration (mol) of $Ce(OH)_4$, and $Y_t$ and $P_t$ represent the concentration (mol) of $Ce(OH)_4$ remaining after stirring and the total concentration (mol) of residual $Ce(OH)_4$, $La(OH)_3$, $Pr(OH)_3$, and $Nd(OH)_3$, respectively. As shown in FIG. 7, at a pH between 1.5 and 2.5, the percent purity of residual $Ce(OH)_4$ exceeded 99%, but at a pH of 1.5, the yield decreased rapidly below 80%. In addition, at a pH higher than 3.5, $La(OH)_3$, $Pr(OH)_3$, and $Nd(OH)_3$ remained as undesirable by-products that interfered with obtaining $Ce(OH)_4$ with high purity.

Example 4: Experiment for Separating Rare Earth Elements from Simulated Polishing Powder Waste to Confirm Applicability of Actually Devised Five-Step Process: Simulated Polishing Powder Waste Composed of a Mixture of $CeO_2$, $La_2O_3$, $Pr_2O_3$, $Nd_2O_3$, CaO, $Al_2O_3$ $SiO_2$ $SiO_2$, and MgO Having a Particle Size of <0.5 μm According to Kim et al. (Kim et al., *J. Rare Earths*, 2011, 29: 1075) and Hoshino et al. (Hoshino et al., *J. Non-Cryst. Solids*, 2001, 283: 129), it was reported that polishing powder waste has a particle size distribution ($D_{50}$/μm) of 1.689 and all particles in the polishing powder waste are fine powder having a particle size of <5 μm. Thus, in this experiment, simulated polishing powder waste was prepared by mixing $CeO_2$, $La_2O_3$, $Pr_2O_3$, $Nd_2O_3$, CaO, $Al_2O_3$, $SiO_2$, $SiO_2$, and MgO, each having a particle size of <5 μm. Regarding the mixing ratio, 23.20 g of $CeO_2$ (the initial amount of $CeO_2$ relative to the initial amount of the mixture: 46.4 wt %, Ce 18.89 g), 11.50 g of $La_2O_3$ (23.0 wt %, La 9.81 g), 1.50 g of $Pr_2O_3$ (3.0 wt %, Pr 1.28 g), 2.60 g of $Nd_2O_3$ (5.2 wt %, Nd 2.23 g), 2.80 g of CaO (5.6 wt %, Ca 2.00 g), 5.70 g of $Al_2O_3$ (11.4 wt %, Al 3.02 g), 2.10 g of $SiO_2$ (4.2 wt %, Si 0.98 g) and 0.60 g of MaO (1.2 wt %, Mg 0.36 g) were used to make a total mass of 50 g. The mixing ratio was applied to a chemical composition similar to the data shown in Table 1 above. On the simulated polishing powder waste, an experiment was performed as shown in FIG. 1.

To obtain the yield of $NaCe(SO_4)_2 \cdot H_2O$ synthesized, the conditions of step 1 were set as follows: the initial amount of the mixture in a $Na_2SO_4$—$H_2SO_4$—$H_2O$ solution according to FIGS. 2, 3, and 5: 50 g/dm³; the concentration of $Na_2SO_4$ in the solution: 0.46 mol/dm³; the initial concentration of sulfuric acid in the solution: 8 mol/dm³; stirring speed: 650 rpm; reaction time: 36 hours; and reaction temperature: 125° C. The results of step 1 indicated that the product included a mixture of $NaRe(SO_4)_2 \cdot xH_2O$, $Al_2O_3$, and $SiO_2$.

As shown in Table 2 below, based on the solubility of $CaSO_4$ and $MgSO_4$ in the $Na_2SO_4$—$H_2SO_4$—$H_2O$ solution, Ca and Mg can be removed as liquified primary impurities (leachate A) by solid-liquid separation after the reaction in step 1.

ing $Ce^{4+}$ (0.75 g), $La^{3+}$ (9.59 g), $Pr^{3+}$ (1.22 g), and $Nd^{3+}$ (2.14 g). Then, the residues were added to 1000 mL of an acid solution containing 1 mol $H_2SO_4$ to dissolve $Ce(OH)_4$. After filtration, the concentration of $Ce^{4+}$ dissolved in leachate C was 17.94 g, and the concentration of other impurities was only less than 0.08 g. In addition, the final residue (solidified secondary impurities) remaining in the filtrate was composed of 5.57 g of $Al_2O_3$ (2.95 g of Al) and 2.1 g of $SiO_2$ (0.98 g of Si). The amount of element separated in each step can be seen in Table 2 above.

A method of recovering rare earth elements from rare earth polishing powder waste by a five-step hydrometallurgical process according to the present invention can recover 95% or more of rare earth elements, including cerium (Ce), lanthanum (La), praseodymium (Pr), and neodymium (Nd), from the polishing powder waste, and rare earth elements are recovered through such an efficient process so that great economic gains can be achieved.

INDUSTRIAL APPLICABILITY

A method of recovering rare earth elements from rare earth polishing powder waste by a five-step hydrometallur-

TABLE 2

Results of chemical analysis of liquified primary impurities (leachate A), leachate B containing La, Pr, and Nd dissolved therein, leachate C containing Ce dissolved therein, and solidified secondary impurities, which are separated in each step

| | | Amount separated/g (Sc) | | | |
|---|---|---|---|---|---|
| Elements | Initial amount(g) | Liquified primary impurities (leachate A) | Leachate B containing La, Pr, and Nd dissolved therein | Leachate C containing Ce dissolved therein | Solidified secondary impurities |
| Ce | 18.89 | 0.20(1.0) | 0.75(4.0) | 17.94(95.0) | <0.01(<0.1) |
| La | 9.81 | 0.16(1.6) | 9.59(97.7) | 0.06(0.7) | <0.01(<0.1) |
| Pr | 1.28 | 0.06(4.7) | 1.22(95.0) | <0.01(<0.3) | <0.01(<0.1) |
| Nd | 2.23 | 0.08(3.6) | 2.14(95.9) | 0.01(0.5) | <0.01(<0.1) |
| Ca | 2.00 | 2.00 | <0.01 | <0.01 | <0.01 |
| Al | 3.02 | 0.07 | <0.01 | <0.01 | 2.95 |
| Si | 0.98 | <0.01 | <0.01 | <0.01 | 0.98 |
| Mg | 0.36 | 0.36 | <0.01 | <0.01 | <0.01 |

Figure 8:
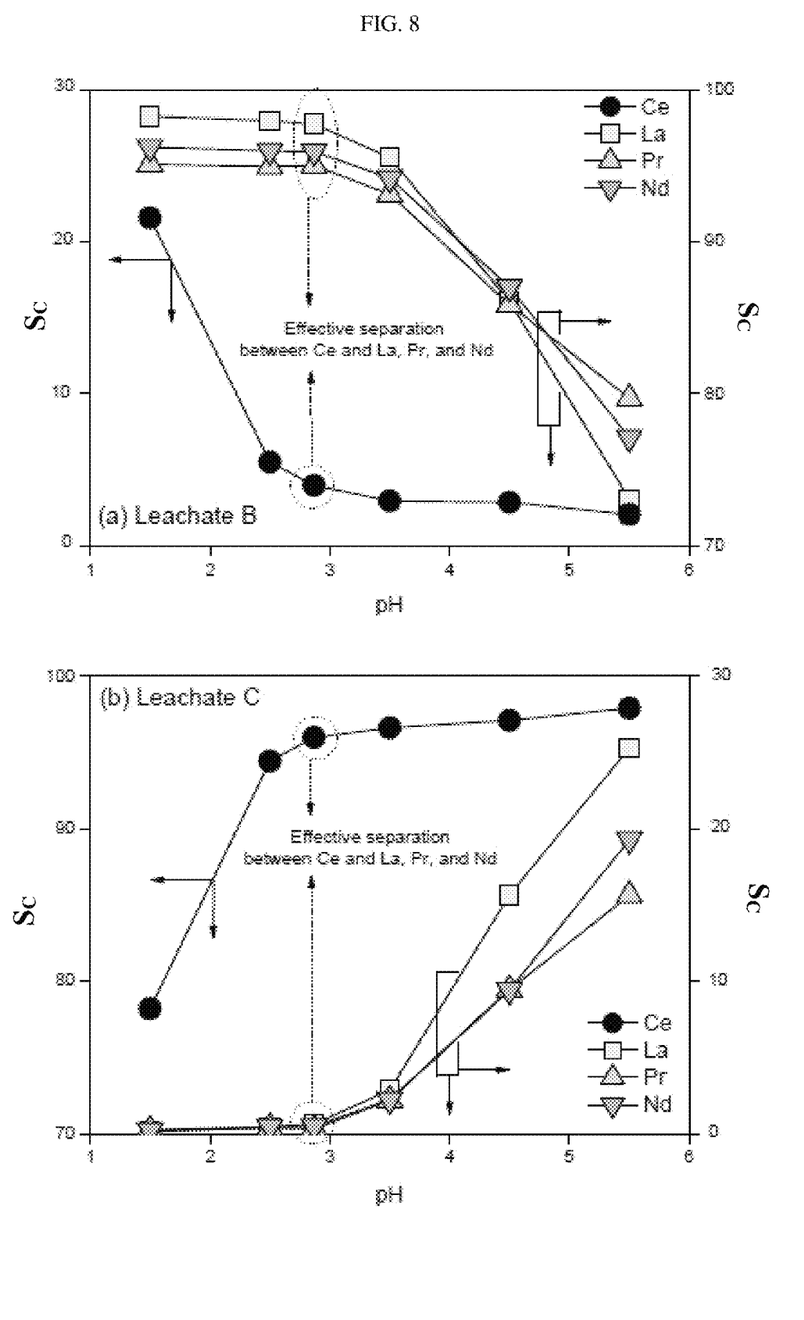
FIG. 8 is a graph showing the changes in percent separation ($S_c$) of Ce, La, Pr and Nd from (a) leachate B and (b) leachate C in step 4 of the separation method according to the present invention.

Next, in step 2, 1000 mL of an alkaline solution containing 0.7 mol NaOH was added to convert $NaRe(SO_4)_2 \cdot xH_2O$ into $Re(OH)_3$. In step 3, $O_2$-containing air was injected into the $Re(OH)_3$-containing solution, and $Ce(OH)_3$ was oxidized into $Ce(OH)_4$ at a stirring speed of 650 rpm and a reaction temperature of 80° C. for 12 hours. In hydrochloric acid leaching in step 4 after oxidation, the effect of pH on the percent separation ($S_c$) of Ce, La, Pr, and Nd from leachate B (containing La, Pr, and Nd dissolved therein) and leachate C (containing Ce dissolved therein) was examined, and the results are shown in FIG. 8. The pH range shown in FIG. 8 was based on the data shown in FIG. 7. The percent separation ($S_c$) of Ce, La, Pr, and Nd was calculated using the following equation:

$$S_c = (Re_r/Re_0) \times 100 \quad (15)$$

wherein $Re_0$ represents the amount (g) of Ce, La, Pr or Nd in the initial mixture, and $Re_r$ represents the amount of Ce, La, Pr or Nd separated.

As a result, for effective separation between Ce, La, Pr and Nd in percent separation (Sc), the solution was adjusted to pH 2.83 by addition of 0.31 mol HCl at 25° C. (at least acid leaching should be performed at a pH of 2.5 to 3.5).

After acid leaching with HCl in step 4, $Ca(OH)_4$, $Al_2O_3$, and $SiO_2$ residues were separated from leachate B containgical process according to the present invention can recover and recycle 95% or more of rare earth elements, including cerium (Ce), lanthanum (La), praseodymium (Pr), and neodymium (Nd), from the polishing powder waste, and thus can contribute to achieving economic gains and securing resources.

Although the present invention has been described in detail with reference to the specific features, it will be apparent to those skilled in the art that this description is only for a preferred embodiment and does not limit the scope of the present invention.

What is claimed is:

1. A method of separating rare earth elements from polishing powder waste comprising the rare earth elements, said method comprising:
   (a) synthesizing a solution of sodium rare earth sulfate, $NaRe(SO_4)_2 \cdot xH_2O$ wherein Re represents rare earth elements and x is a rational number from 0 to 2, by adding the polishing powder waste to an aqueous solution of $Na_2SO_4$ and $H_2SO_4$;
   (b) removing a leachate A containing liquefied impurities from the synthesized sodium rare earth sulfate solution of step (a) by solid-liquid separation, and then converting the sodium rare earth sulfate ($NaRe(SO_4)_2 \cdot xH_2O$) contained in a remaining solid material into trivalent rare earth hydroxides (Re(OH)$_3$) and obtaining a solution containing solids Ce(OH)$_3$, La(OH)$_3$, Nd(OH)$_3$ and Pr(OH)$_3$ by adding the remaining solid material to an aqueous solution of NaOH;

(c) oxidizing trivalent cerium hydroxide (Ce(OH)$_3$) into tetravalent cerium hydroxide (Ce(OH)$_4$) and obtaining a solution containing solids Ce(OH)$_4$, La(OH)$_3$, Nd(OH)$_3$ and Pr(OH)$_3$ by injecting O$_2$ containing air into the solution containing solids Ce(OH)$_3$, La(OH)$_3$, Nd(OH)$_3$ and Pr(OH)$_3$ of step (b);

(d) dissolving trivalent lanthanum hydroxide (La(OH)$_3$), praseodymium hydroxide (Pr(OH)$_3$), and neodymium hydroxide (Nd(OH)$_3$) by adding HCl to the solution containing solids Ce(OH)$_4$, La(OH)$_3$, Nd(OH)$_3$ and Pr(OH)$_3$ resulting from step (c) and then separating by solid-liquid separation of the solution, obtaining Ce(OH)$_4$ solid and a leachate B wherein lanthanum (La), praseodymium (Pr) and neodymium (Nd) are dissolved, and subjecting separation of lanthanum (La), praseodymium (Pr) and neodymium (Nd); and (e) adding H$_2$SO$_4$ to a solid material Ce(OH)$_4$ remaining after the separating in step (d) to dissolve the tetravalent cerium hydroxide (Ce(OH)$_4$), separating by solid-liquid separation to remove solid impurities and obtain a leachate C wherein cerium (Ce) is dissolved, and subjecting separation of cerium (Ce) from the leachate C.

2. The method of claim 1, wherein step (a) is performed at a temperature of at least 95° C.

3. The method of claim 1, wherein concentrations of Na$_2$SO$_4$ and H$_2$SO$_4$ in step (a) are 0.4 to 2.5 mol/dm$^3$ and 6 to 14 mol/dm$^3$, respectively.

4. The method of claim 1, wherein step (d) is performed at a pH of 1.5 to 5.5.

\* \* \* \* \*

UNITED STATES PATENT AND TRADEMARK OFFICE
CERTIFICATE OF CORRECTION

PATENT NO. : 10,738,369 B2
APPLICATION NO. : 15/826253
DATED : August 11, 2020
INVENTOR(S) : Namil Um et al.

Page 1 of 1

It is certified that error appears in the above-identified patent and that said Letters Patent is hereby corrected as shown below:

In the Specification

Column 3, Line 4: "$(Ce(OH)_4))$" should be -- $(Ce(OH)_4)$ --.

Signed and Sealed this
Fifteenth Day of September, 2020

Andrei Iancu
*Director of the United States Patent and Trademark Office*